United States Patent
Duong

(10) Patent No.: US 11,286,951 B2
(45) Date of Patent: Mar. 29, 2022

(54) DIFFUSER PIPE WITH EXIT SCALLOPS

(71) Applicant: PRATT & WHITNEY CANADA CORP., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 213 days.

(21) Appl. No.: 16/418,263

(22) Filed: May 21, 2019

(65) Prior Publication Data

US 2020/0370567 A1 Nov. 26, 2020

(51) Int. Cl.
| F04D 29/44 | (2006.01) |
| F04D 29/66 | (2006.01) |
| F04D 17/10 | (2006.01) |

(52) U.S. Cl.
CPC .......... F04D 29/441 (2013.01); F04D 17/10 (2013.01); F04D 29/44 (2013.01); F04D 29/667 (2013.01)

(58) Field of Classification Search
CPC ........ F04D 17/10; F04D 29/44; F04D 29/441; F04D 29/444; F04D 29/667; F05D 2220/32; F05D 2240/128; F05D 2250/667; F05D 2260/60
See application file for complete search history.

(56) References Cited

U.S. PATENT DOCUMENTS

| 3,290,066 A | * | 12/1966 | Primich ................ F16L 43/002 |
| | | | 285/183 |
| 3,719,430 A | | 3/1973 | Blair et al. |
| 3,920,271 A | * | 11/1975 | Bluestone .............. F24F 13/02 |
| | | | 285/148.22 |
| 8,425,188 B2 | * | 4/2013 | Dovbush ............... F04D 29/681 |
| | | | 415/208.3 |
| 9,512,733 B2 | | 12/2016 | Lombard et al. |
| 2019/0293087 A1 | * | 9/2019 | Tamada ................ F04D 29/441 |
| 2019/0316600 A1 | * | 10/2019 | Duong ..................... F02K 3/06 |

* cited by examiner

*Primary Examiner* — Brian P Wolcott
*Assistant Examiner* — Sang K Kim
(74) *Attorney, Agent, or Firm* — Norton Rose Fulbright Canada LLP

(57) ABSTRACT

A diffuser pipe is disclosed having a tubular body including a first portion extending in a generally radial direction, a second portion extending in a generally axial direction and terminating at a pipe outlet, and a bend portion fluidly linking the first portion and the second portion. The pipe outlet is scalloped.

10 Claims, 2 Drawing Sheets

DIFFUSER PIPE WITH EXIT SCALLOPS

TECHNICAL FIELD

The present disclosure relates generally to centrifugal compressors, and more particularly to diffuser pipes for such centrifugal compressors.

BACKGROUND

Diffuser pipes are provided in certain gas turbine engines for diffusing a flow of high speed air received from an impeller of a centrifugal compressor and directing the flow to a downstream component, such as an annular chamber containing the combustor or another compression stage. The diffuser pipes are typically circumferentially arranged at a periphery of the impeller, and are designed to transform kinetic energy of the flow into pressure energy. Diffuser pipes seek to provide a uniform exit flow with minimal distortion, as it is preferable for flame stability, low combustor loss, reduced hot spots etc. Vibrations and other loads to which the diffuser pipes are exposed in operation can cause undesirable damage thereto (e.g. cracks in the diffuser).

SUMMARY

There is provided a compressor diffuser for a gas turbine engine, the compressor diffuser comprising: diffuser pipes having a tubular body including a first portion extending in a generally radial direction, a second portion extending in a generally axial direction and terminating at a pipe outlet, and a bend portion fluidly linking the first portion and the second portion, the pipe outlet being scalloped.

There is provided a diffuser pipe having a tubular body including a first portion extending in a generally radial direction, a second portion extending in a generally axial direction and terminating at a pipe outlet, and a bend portion fluidly linking the first portion and the second portion, the pipe outlet being scalloped.

There is provided a method of modifying a vibratory response of a diffuser pipe, the method comprising providing an outlet of the diffuser pipe with scalloped openings.

BRIEF DESCRIPTION OF THE DRAWINGS

Reference is now made to the accompanying figures in which.

DETAILED DESCRIPTION

Figure 1:
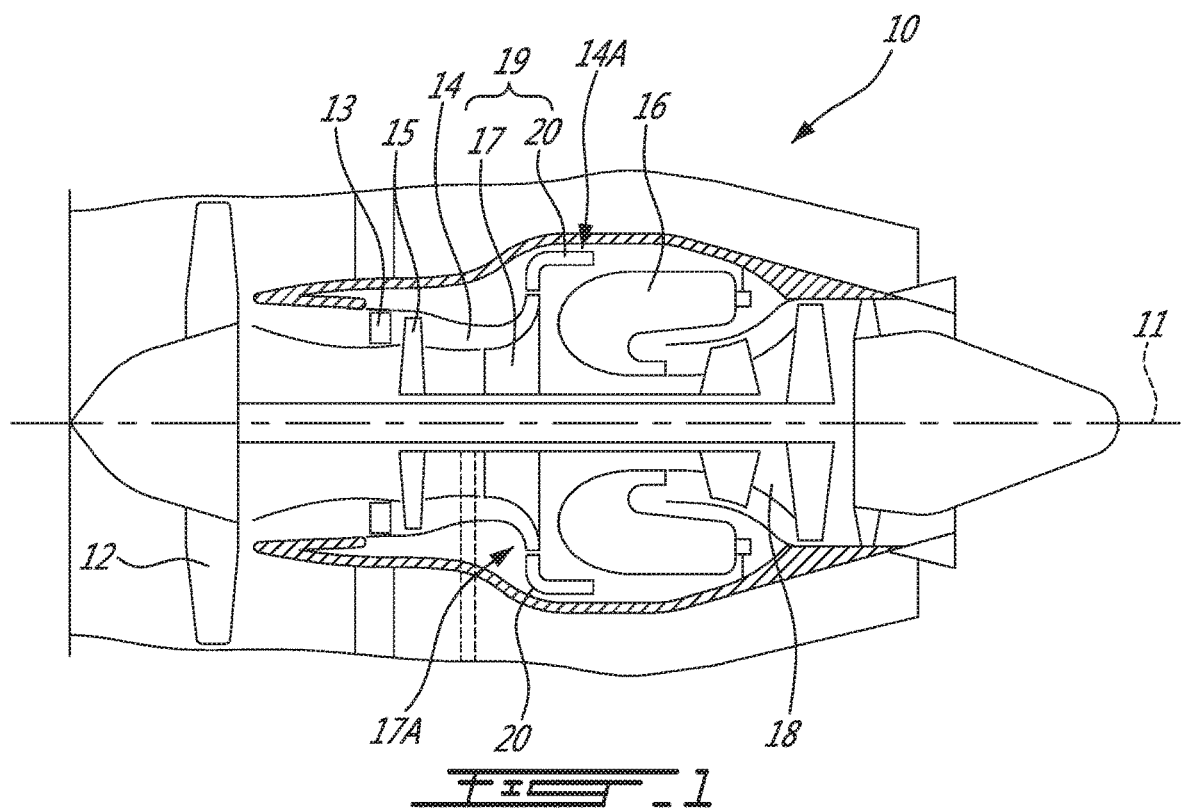
FIG. 1 is a schematic cross-sectional view of a gas turbine engine.

FIG. 1 illustrates a gas turbine engine 10 of a type preferably provided for use in subsonic flight, generally comprising in serial flow communication along an engine center axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a plurality of stators 13 and rotors 15 (only one stator 13 and rotor 15 being shown in FIG. 1), and it may include a centrifugal compressor 19.

The centrifugal compressor 19 of the compressor section 14 includes an impeller 17 with vanes and a compressor diffuser 14A. The compressor diffuser 14A includes a plurality of diffuser pipes 20, which are located downstream of the impeller 17 and circumferentially disposed about a periphery of a radial outlet 17A of the impeller 17. The diffuser pipes 20 convert high kinetic energy at the impeller 17 exit to static pressure by slowing down fluid flow exiting the impeller. The diffuser pipes 20 also redirect the air flow from a radial orientation to an axial orientation (i.e. aligned with the engine axis 11). In most cases, the Mach number of the flow entering the diffuser pipe 20 may be at or near sonic, while the Mach number exiting the diffuser pipe 20 may be less than 0.25 to enable stable air/fuel mixing, and light/relight in the combustor 16.

Figure 2:
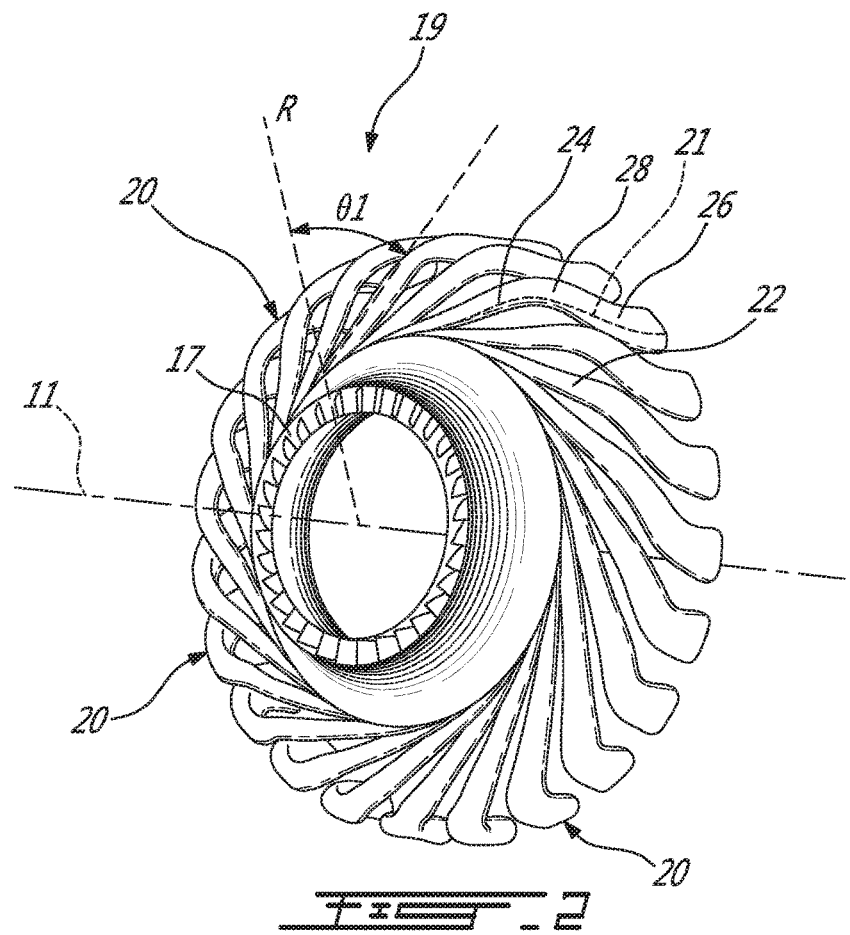
FIG. 2 is a perspective view of a centrifugal compressor of the gas turbine of FIG. 1, the centrifugal compressor including an impeller and diffuser pipes.

FIG. 2 shows the impeller 17 and the plurality of diffuser pipes 20, also referred to as "fishtail diffuser pipes", of the centrifugal compressor 19. Each of the diffuser pipes 20 includes a diverging (in a downstream direction) tubular body 22, formed, in one embodiment, of sheet metal. The enclosed tubular body 22 defines a flow passage 29 (see FIG. 3) extending the length of the diffuser pipe 20 through which the compressed fluid flow is conveyed. The tubular body 22 includes a first portion 24 extending generally tangentially from the periphery and the radial outlet 17A of the impeller 17. An open end is provided at an upstream end of the tubular body 22 and forms an inlet of the diffuser pipe 20 in the first portion 24. In FIG. 2, the first portion 24 is inclined at an angle 81 relative to a radial axis R extending from the engine axis 11. The angle 81 may be at least partially tangential, or even substantially tangentially, and may further correspond to a direction of fluid flow at the exit of the blades of the impeller 17, such as to facilitate transition of the flow from the impeller 17 to the diffuser pipes 20. The first portion 24 of the tubular body 22 can alternatively extend more substantially along the radial axis R.

The tubular body 22 of the diffuser pipes 20 also includes a second portion 26, which is disposed generally axially and is connected to the first portion 24 by an out-of-plane curved or bend portion 28. An open end at the downstream end of the second portion 26 forms a pipe outlet 25 (see, e.g., FIG. 3) of the diffuser pipe 20. Preferably, but not necessarily, the first portion 24 and the second portion 26 of the diffuser pipes 20 are integrally formed together and extend substantially uninterrupted between each other, via the curved, bend portion 28.

The large radial velocity component of the flow exiting the impeller 17, and therefore entering the first portion 24 of each of the diffuser pipes 20, may be removed by shaping the diffuser pipe 20 with the bend portion 28, such that the flow is redirected axially through the second portion 26 before exiting via the outlet 25 to the combustor 16. It will thus be appreciated that the flow exiting the impeller 17 enters the inlet and the upstream first portion 24 and flows along a generally radial first direction. At the outlet of the first portion 24, the flow enters the bend portion 28 which functions to turn the flow from a substantially radial direction to a substantially axial direction. The bend portion 28 may form a 90 degree bend. At the outlet of the bend portion 28, the flow enters the downstream second portion 26 and flows along a substantially axial second direction different from the generally radial first direction. By "generally radial", it is understood that the flow may have axial, radial, and/or circumferential velocity components, but that the axial and circumferential velocity components are much smaller in magnitude than the radial velocity component. Similarly, by "generally axial", it is understood that the flow may have axial, radial, and/or circumferential velocity components, but that the radial and circumferential velocity components are much smaller in magnitude than the axial velocity component.

Figure 3:
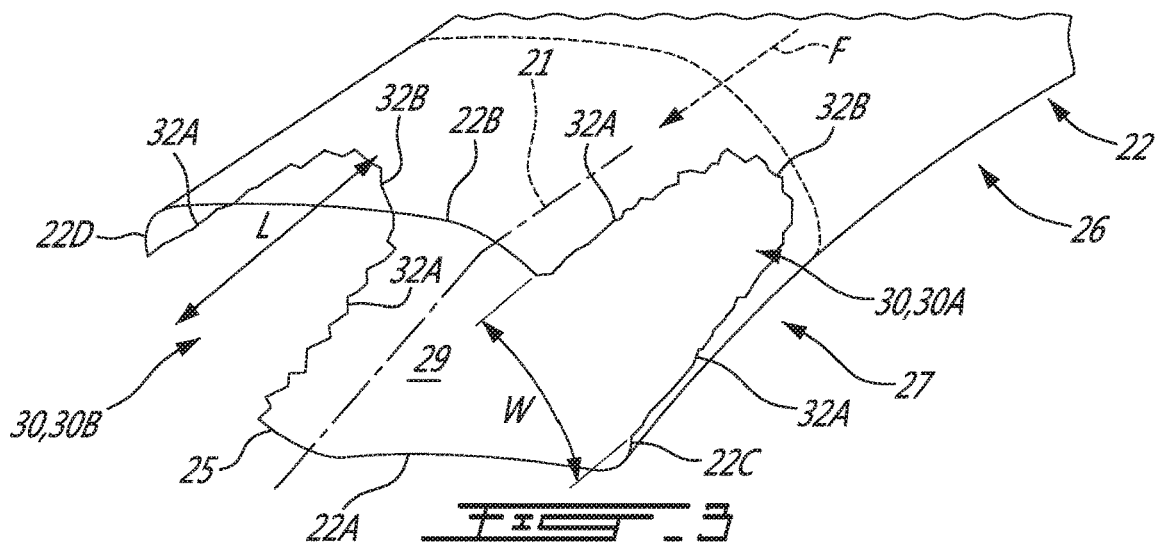
FIG. 3 is a perspective view of an outlet of one of the diffuser pipes of FIG. 2, the outlet being scalloped.

Referring now to FIG. 3, the tubular body 22 of each diffuser pipe 20 has an exit segment 27, shown as the portion of the tubular body 22 downstream of the dotted line. The exit segment 27 is a downstream portion of the tubular body 22 through which the flow is conveyed. In the depicted embodiment, the exit segment 27 extends over a portion of the length of the tubular body 22, and is positioned downstream of the bend portion 28. The exit segment 27 begins at a location downstream of the bend portion 28 and terminates at the pipe outlet 25. The exit segment 27 includes and defines the pipe outlet 25. The exit segment 27 is disposed entirely within the second portion 26 of the tubular body 22 in the depicted embodiment. The exit segment 27 is the last portion of the tubular body 22 through which the flow is conveyed. In one possible configuration, the exit segment 27 occupies up to 15%% of the length of the tubular body 22.

Still referring now to FIG. 3, the tubular body 22 of each diffuser pipe 20 has a radially inner wall 22A and a radially outer wall 22B. The tubular body 22 also has a first side wall 22C spaced circumferentially apart across the flow passage 29 from a second side wall 22D. The radially inner and outer walls 22A,22B and the first and second side walls 22C,22D meet and are connected to form the enclosed flow passage 29 extending through the length of the tubular body 22. The radially inner wall 22A corresponds to the wall of the tubular body 22 that has the smallest turning radius at the bend portion 28, and the radially outer wall 22B corresponds to the wall of the tubular body 22 that has the largest turning radius at the curved portion 28.

The tubular body 22 diverges in the direction of fluid flow F therethrough, in that the internal flow passage 29 defined within the tubular body 22 increases in cross-sectional area along its length which extends between the inlet of the diffuser pipe 20 and the pipe outlet 25. This increase in cross-sectional area of the flow passage 29 through each diffuser pipe 20 may be continuous along the complete length of the tubular body 22, or the cross-sectional area of the flow passage 29 may increase in gradual increments along the length of the tubular body 22. In the depicted embodiment, the cross-sectional area of the flow passage 29 defined within the tubular body 22 increases gradually and continuously along its length, from the inlet to the pipe outlet 25. The pipe outlet 25 is circumscribed by a peripheral edge of the diffuser pipe 20 at its exit, where the peripheral edge is defined by the inner, outer, and side walls 22A,22B, 22C,22D. The direction of fluid flow F is generally along a pipe center axis 21 of the tubular body 22. The pipe center axis 21 extends through each of the first, second, and bend portions 24,26,28 and has the same orientation as these portions. The pipe center axis 21 is thus curved. In the depicted embodiment, the pipe center axis 21 is equidistantly spaced from the radially inner and outer walls 22A, 22B of the tubular body 22, and from the first and second side walls 22C,22D, along the length of the tubular body 22.

Still referring to FIG. 3, the tubular body 22 is scalloped at the pipe outlet 25. Portions of the tubular body 22 are therefore absent or removed at the pipe outlet 25, such that the diffuser pipe 20 is perforated at the pipe outlet 25. The fluid flow F in the flow passage 29 is conveyed through the scalloped regions of the diffuser pipe 20 at the pipe outlet 25. The diffuser pipe 20 is thus said to be "scalloped" at its exit segment 27, and the exit segment 27 thus forms a "scalloped portion" of the diffuser pipe 20.

There is thus disclosed diffuser pipes 20 for a centrifugal compressor 19 which have scalloped regions at their exits. Regardless of the shape/number/size of the scalloped regions, they represent a removal of the material of the diffuser pipe 20 from the pipe outlet 25 thereof, which has the effect of reducing the mass of the diffuser pipe 20 at its exit. The mass reduction at the pipe outlet 25 helps to move the center of mass of the diffuser pipe 20 rearward (i.e. upstream) and away from the pipe outlet 25. The reduction of mass of the diffuser pipes 20 at their pipe outlets 25 may reduce overall bending of the diffuser pipes 20. The mass reduction at the pipe outlet 25 may have the effect of reducing the effective length of the diffuser pipe 20 from a dynamics/frequency vibrational perspective, which may help raise the natural frequency of the diffuser pipe 20 and help it avoid potentially problematic bending modes, such as the 1E interference for bending mode, during operation of the centrifugal compressor 19. Thus the "scalloping" described herein may create a quasi-length reduction for dynamics frequency purposes while still preserving sufficient diffuser pipe 20 length to guide the fluid flow F for performance purposes. Removing some material at the pipe outlet 25 may help reduce some strain energy, and thus may assist in reducing pipe cracking. Positioning the scalloped regions at specific locations of the pipe outlet 25 may help to improve the quality of the fluid flow F exiting the diffuser pipe 20.

The scalloping at the pipe outlet 25 may take different forms, some of which are now described in greater detail. Referring to FIG. 3, the tubular body 22 includes scalloped openings 30 which extend through one or more of the walls 22A,22B,22C,22D of the tubular body 22. In the depicted embodiment, the scalloped openings 30 are slots, holes, cuts, etc. which extend through one or more of the walls 22A, 22B,22C,22D of the exit segment 27 of the tubular body 22. Some examples of possible numbers, shapes, and/or sizes of the openings 30 at the exit segment 27 are provided below. Other numbers, shapes, and/or sizes of the openings 30 are also possible and within the scope of the present disclosure. The scalloped openings 30 may be of any number, or have any shape or size, at the pipe outlet 25 of the diffuser pipes 20, and examples of possible arrangements of the openings 30 are described below.

In FIG. 3, the pipe outlet 25 has two openings 30. A first opening 30A is positioned on the first side wall 22C of the tubular body 22, and a second opening 30B is positioned on the second side wall 22D. The first and second openings 30A,30B are discrete and separate openings 30. The first and second openings 30A,30B are spaced apart from each other. In FIG. 3, the first and second openings 30A,30B are spaced apart from each other by the radially inner and outer walls 22A,22B. In FIG. 3, the same number of openings 30 are positioned on each of the first and second side walls 22C, 22D and are in alignment. In FIG. 3, the first and second openings 30A,30B are spaced on opposite walls 22C,22D of the tubular body 22. In FIG. 3, the first and second openings 30A,30B are symmetrically positioned about a plane extending through the pipe center axis 21 and through a center point of the inner and outer walls 22A,22B. Both the first and second openings 30A,30B extend through the first and second side walls 22C,22D.

Still referring to FIG. 3, the first and second openings 30A,30B have substantially the same shape. Each of the first and second openings 30A,30B has opening side walls 32A which extend in an upstream direction from the peripheral edge defining the pipe outlet 25 to an opening end wall 32B. The opening end wall 32B is curved. The opening end wall 32B has a concave curvature when viewed from the pipe outlet 25. The rounded or curved opening end wall 32B may help reduce stress concentrations and potential local cracking of the diffuser pipe 20. The opening side walls 32A are transverse. The opening side walls 32A are not parallel. The opening side walls 32A converge or taper toward one another in an upstream direction.

Each of the first and second openings 30A,30B has a length L. The length L of each opening 30A,30B is defined from the peripheral edge defining the pipe outlet 25 to a location of the exit segment 27 upstream of the pipe outlet 25. The length L of each opening 30A,30B is measured from the peripheral edge defining the pipe outlet 25 to the opening end wall 32B. Thus each opening 30A,30B defines or delimits part of the pipe outlet 25. In FIG. 3, the length L of each opening 30A,30B is between about 1% and 10% of the length of the tubular body 22. The length L of the first and second openings 30A,30B is the same. Providing the openings 30A,30B with the same length L may improve balance at the exit segment 27 and facilitate the manufacturing of the openings 30A,30B. The openings 30A,30B also have a width W, measured between the opening side walls 32A at the pipe outlet 25. The width W of the openings 30A,30B in FIG. 3 is 0.27 in. A length-to-width (L/W) of the openings 30A,30B is defined, where the width W is a maximum width (e.g. at the pipe outlet 25). In FIG. 3, values for the L/W may be between 0.5 to 2. The width W of the openings 30A,30B varies over their length L. The width W of the openings 30A,30B decreases toward the opening end wall 32B. In an alternate embodiment, the openings 30 are spaced upstream of the peripheral edge defining the pipe outlet 25 within the exit segment 27. In an alternate embodiment, the length L of one of the openings 30 is different from the length L of at least another one of the openings 30. In an alternate embodiment, the width of one of the openings 30 is different from the width of at least another one of the openings 30.

Figure 4:
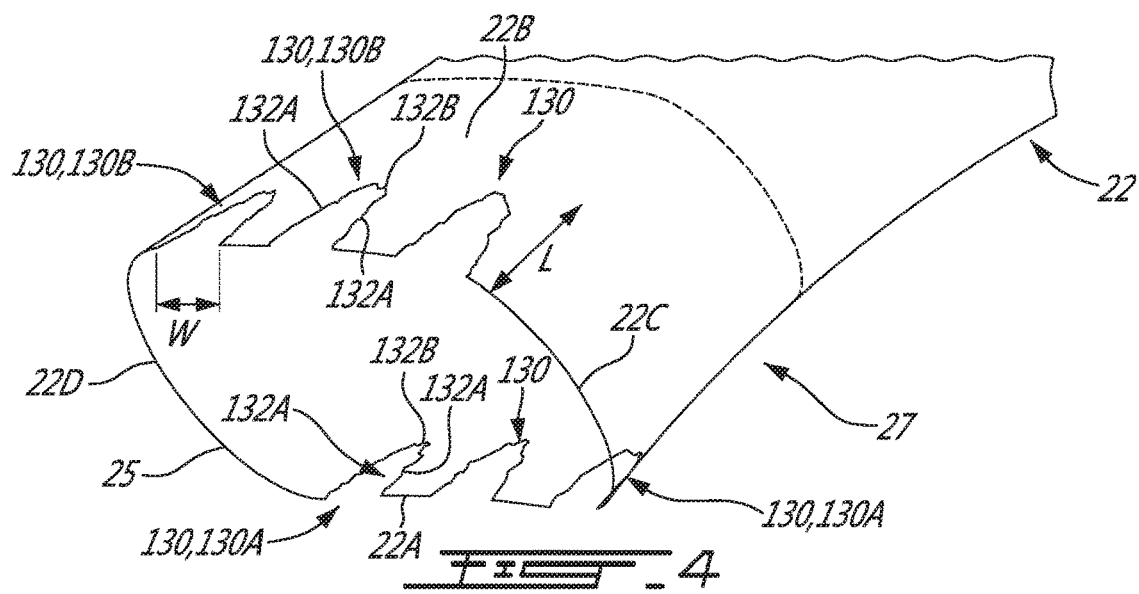
FIG. 4 is a perspective view of an outlet of one of the diffuser pipes of FIG. 2, the outlet being scalloped according to another embodiment.

Another possible arrangement of the openings 130 is shown in FIG. 4. The exit segment 27 and the tubular body 22 shown in FIG. 4 are the same as those shown in FIG. 3, the only difference in FIG. 4 being the openings 130 and their arrangement. Therefore, reference numbers used in FIG. 3 will be used to denote features in FIG. 4. The pipe outlet 25 has six openings 130. Three inner openings 130A are positioned on the radially inner wall 22A of the tubular body 22, and three outer openings 130B are positioned on the radially outer wall 22B. The inner and outer openings 130A,130B are discrete and separate openings 130. The inner and outer openings 130A,130B are spaced apart from each other. In FIG. 4, the inner and outer openings 130A,130B are spaced apart from each other by the inner and outer side walls 22C,22D. In FIG. 4, the same number of openings 130 are positioned on each of the inner and outer walls 22A,22B and are in alignment. In FIG. 4, the inner and outer openings 130A,130B are spaced on opposite walls 22A,22B of the tubular body 22. In FIG. 4, the inner and outer openings 130A,130B are symmetrically positioned about a plane extending through the pipe center axis 21 and through a center point of the inner and outer side walls 22C,22D. Both the inner and outer openings 130A,130B extend through the inner and outer walls 22A,22B.

Still referring to FIG. 4, the inner and outer openings 130A,130B have substantially the same shape. Each of the inner and outer openings 130A,130B has opening side walls 132A which extend in an upstream direction from the pipe outlet 25 to an opening end wall 132B. The opening end wall 132B is curved. The opening end wall 132B has a concave curvature when viewed from the pipe outlet 25. The rounded or curved opening end wall 132B may help reduce stress concentrations and potential local cracking of the diffuser pipe 20. The opening side walls 132A are transverse. The opening side walls 132A are not parallel. The opening side walls 132A converge or taper toward one another in an upstream direction.

Each of the inner and outer openings 130A,130B has a length L. The length L of each opening 130A,130B is defined from the pipe outlet 25 to a location of the exit segment 27 upstream of the pipe outlet 25. The length L of each opening 130A,130B is measured from the pipe outlet 25 to the opening end wall 132B. Thus each opening 130A,130B defines or delimits part of the pipe outlet 25. In FIG. 4, the length L of each opening 130A,130B is 0.17 in. The length L of the inner and outer openings 130A,130B is the same. Providing the openings 130A,130B with the same length L may improve balance at the exit segment 27 and facilitate the manufacturing of the openings 130A,130B. The openings 130A,130B also have a width W, measured between the opening side walls 132A at the pipe outlet 25. A length-to-width (L/W) of the openings 130A,130B is defined, where the width W is a maximum width (e.g. at the pipe outlet 25). In FIG. 4, values for the L/W may be between 0.5 to 2. The width W of the openings 130A,130B varies over their length L. The width W of the openings 130A,130B decreases toward the opening end wall 132B.

The openings 130 in FIG. 4 are narrower and shorter than the openings 30 in FIG. 3. A general rule may be formulated, whereby the greater the number of openings 30,130 in the exit segment 27, the smaller each one can be. In an embodiment, the overall surface area at the pipe outlet 25 is the same for the arrangement of the openings 30 and for the arrangement of the openings 130.

Figure 5:
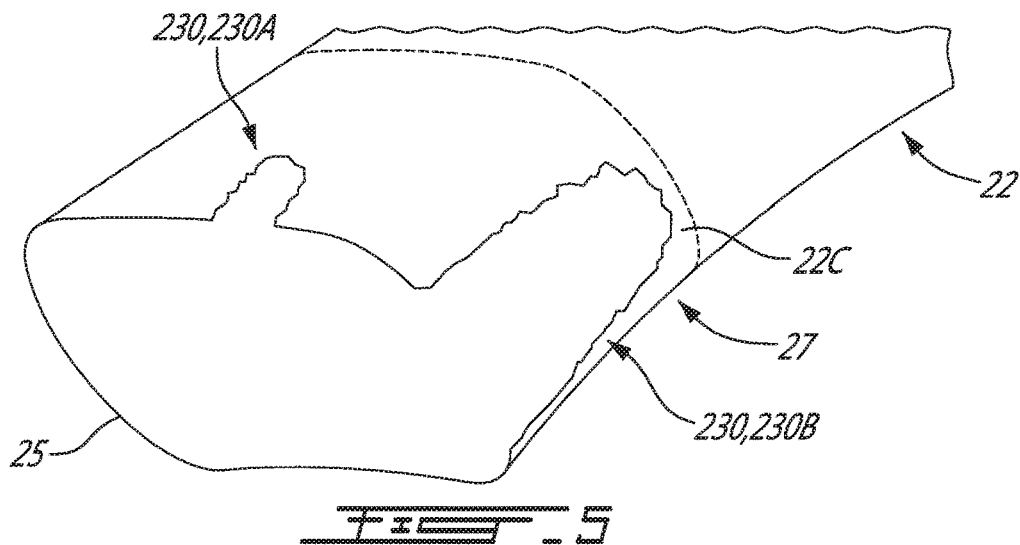
FIG. 5 is a perspective view of an outlet of one of the diffuser pipes of FIG. 2, the outlet being scalloped according to another embodiment.

Another possible arrangement of the openings 230 is shown in FIG. 5. The exit segment 27 and the tubular body 22 shown in FIG. 5 are the same as those shown in FIGS. 3 and 4, the only difference in FIG. 5 being the openings 230 and their arrangement. Therefore, reference numbers used in FIGS. 3 and 4 will be used to denote features in FIG. 5. The pipe outlet 25 has two openings 230. A first opening 230A is positioned on the radially outer wall 22B of the tubular body 22, and a second opening 230B is positioned on the first side wall 22C. The first and second openings 230A, 230B are discrete and separate openings 230. The first and second openings 230A,230B are spaced apart from each other. In FIG. 5, the inner wall 22A and the second side wall 22D are free of openings 230. In FIG. 5, the first opening 230A extends through the outer wall 22B, and the second opening 230B extends through the first side wall 22C. Thus, in the embodiment shown in FIG. 5, the openings 230A, 230B extend through different walls of the exit segment 27. In FIG. 5, the arrangement of the openings 230 is asymmetrical. In FIG. 5, the first and second openings 230A, 230B have different shapes and sizes.

Referring to FIG. 3, there is also disclosed a method of modifying a vibratory or dynamic response of the diffuser pipe 20. The method includes providing the pipe outlet 25 with the openings 30. The method may include forming the openings 30 by removing mass from the exit segment 27.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A compressor diffuser, the compressor diffuser comprising: diffuser pipes having a tubular body including a first portion extending in a generally radial direction, a second portion extending in a generally axial direction and terminating at a pipe outlet, and a bend portion fluidly linking the first portion and the second portion, the pipe outlet having scalloped openings extending through the second portion.

2. The compressor diffuser of claim 1, wherein a length of the scalloped openings is defined from the pipe outlet to a location upstream of the pipe outlet.

3. The compressor diffuser of claim 2, wherein the scalloped openings have the same length.

4. The compressor diffuser of claim 1, wherein the scalloped openings are spaced apart from each other.

5. The compressor diffuser of claim 1, wherein the tubular body has a radially inner wall and a radially outer wall, and circumferentially-spaced side walls extending between the radially inner and outer walls, the scalloped openings extending through each of the radially inner and outer walls.

6. The compressor diffuser of claim 5, wherein a number of scalloped openings extend through the radially inner wall, and the same number of scalloped openings extend through the radially outer wall in alignment with the scalloped openings in the radially inner wall.

7. The compressor diffuser of claim 1, wherein the tubular body has a radially inner wall and a radially outer wall, and circumferentially-spaced side walls extending between the radially inner and outer walls, the scalloped openings extending through each of the side walls.

8. The compressor diffuser of claim 7, wherein a number of scalloped openings extend through one of the side walls, and the same number of scalloped openings extend through the other side wall in alignment with the scalloped openings in said one of the side walls.

9. The compressor diffuser of claim 1, wherein the scalloped openings have rounded edges.

10. The compressor diffuser of claim 1, wherein one or more of the scalloped openings are spaced upstream of an edge of the second portion defining the pipe outlet.

* * * * *